US 6,983,259 B1

(12) United States Patent
Foray et al.

(10) Patent No.: US 6,983,259 B1
(45) Date of Patent: Jan. 3, 2006

(54) ANONYMOUS TRADING SYSTEM

(75) Inventors: Andrew P. Foray, Wayne, NJ (US); Michael S. Merold, Sparta, NJ (US)

(73) Assignee: EBS Group Limited, London (GB)

( * ) Notice: Subject to any disclaimer, the term of this patent is extended or adjusted under 35 U.S.C. 154(b) by 450 days.

(21) Appl. No.: 09/603,515

(22) Filed: Jun. 23, 2000

(51) Int. Cl.
G06F 17/60 (2006.01)

(52) U.S. Cl. ............................ 705/37; 705/35; 705/39; 705/42; 705/44; 709/221

(58) Field of Classification Search ................ 705/35, 705/36, 37; 709/221
See application file for complete search history.

(56) References Cited

U.S. PATENT DOCUMENTS

| | | |
|---|---|---|
| 3,823,387 A | 7/1974 | McClellan |
| 4,388,489 A | 6/1983 | Wigan et al. |
| 4,525,779 A | 6/1985 | Davids et al. |
| 4,531,184 A | 7/1985 | Wigan et al. |
| 4,554,418 A | 11/1985 | Toy |
| 4,555,781 A | 11/1985 | Baldry et al. |
| 4,598,367 A | 7/1986 | DeFrancesco et al. |
| 4,623,964 A | 11/1986 | Getz et al. |
| 4,750,135 A | 6/1988 | Boilen |
| 4,815,030 A | 3/1989 | Cross et al. |
| 5,003,473 A | 3/1991 | Richards |
| 5,034,916 A | 7/1991 | Ordish |
| 5,077,665 A | 12/1991 | Silverman et al. |
| 5,146,499 A * | 9/1992 | Geffrotin .................... 713/172 |
| 5,195,031 A | 3/1993 | Ordish |
| 5,230,048 A | 7/1993 | Moy |
| 5,257,369 A | 10/1993 | Skeen et al. |
| 5,267,148 A | 11/1993 | Kosaka et al. |
| 5,270,922 A | 12/1993 | Higgins |
| 5,287,787 A | 2/1994 | Satoshi |
| 5,508,913 A | 4/1996 | Yamamoto et al. |
| 5,537,468 A * | 7/1996 | Hartmann ............... 379/221.01 |
| 5,557,780 A | 9/1996 | Edwards et al. |
| 5,557,798 A | 9/1996 | Skeen et al. |
| 5,615,269 A | 3/1997 | Micali |
| 5,710,889 A | 1/1998 | Clark et al. |
| 5,727,165 A | 3/1998 | Ordish et al. |
| 5,787,402 A | 7/1998 | Potter et al. |
| 5,809,483 A | 9/1998 | Broka et al. |
| 5,815,665 A | 9/1998 | Teper et al. |
| 5,864,827 A | 1/1999 | Wilson |
| 5,870,544 A | 2/1999 | Curtis |
| 5,890,140 A | 3/1999 | Clark et al. |

(Continued)

FOREIGN PATENT DOCUMENTS

EP 0 399 850 B1 11/1990

(Continued)

OTHER PUBLICATIONS

Mini Computer forum, Conference Proceedings, 1975.

(Continued)

*Primary Examiner*—Hani M. Kazimi
*Assistant Examiner*—Stefano Karmis
(74) *Attorney, Agent, or Firm*—Dickstein, Shapiro, Morin & Oshinsky, LLP.

(57) ABSTRACT

An anonymous trading system has a clique of arbitrators which match orders from trader terminals and execute deals. One or more branches is attached to each arbitrator connecting trader terminals through a city node and one or more market distributors. At any one time only one arbitrator is active with the passive arbitrators active as market distributors. The active arbitrator is switched according to the geographical location of the greatest market activity.

22 Claims, 2 Drawing Sheets

U.S. PATENT DOCUMENTS

| | | | |
|---|---|---|---|
| 5,905,248 | A | 5/1999 | Russell et al. |
| 5,905,974 | A | 5/1999 | Fraser et al. |
| 5,909,545 | A | 6/1999 | Frese, II et al. |
| 5,915,209 | A | 6/1999 | Lawrence |
| 5,924,082 | A * | 7/1999 | Silverman et al. ............ 705/37 |
| 5,924,083 | A | 7/1999 | Silverman et al. |
| 5,966,531 | A | 10/1999 | Skeen et al. |
| 6,014,627 | A * | 1/2000 | Togher et al. ................. 705/1 |

FOREIGN PATENT DOCUMENTS

| | | |
|---|---|---|
| EP | 0434224 | 6/1991 |
| EP | 0485252 | 5/1992 |
| EP | 0512702 | 11/1992 |
| EP | 0798635 | 10/1997 |
| EP | 0818746 | 1/1998 |
| EP | 0893758 | 1/1999 |
| EP | 0907134 | 4/1999 |
| FR | 2543327 | 9/1984 |
| GB | 1489574 | 10/1977 |
| GB | 2165421 | 4/1986 |
| GB | 2180380 | 3/1987 |
| GB | 2210714 | 6/1989 |
| GB | 2282246 | 3/1995 |
| GB | 2325130 | 11/1998 |
| GB | 2326256 | 12/1998 |
| WO | 90/02382 | 3/1990 |
| WO | 92/07324 | 4/1992 |
| WO | 92/15174 | 9/1992 |
| WO | 93/15467 | 8/1993 |
| WO | 94/15294 | 7/1994 |
| WO | 95/06918 | 3/1995 |
| WO | 95/18418 | 7/1995 |
| WO | 95/30211 | 11/1995 |
| WO | 96/18963 | 6/1996 |
| WO | 96/34357 | 10/1996 |
| WO | 97/22072 | 6/1997 |
| WO | 97/24833 | 7/1997 |
| WO | 97/31322 | 8/1997 |
| WO | 97/33215 | 9/1997 |
| WO | 97/36253 | 10/1997 |
| WO | 97/43727 | 11/1997 |
| WO | 97/45802 | 12/1997 |
| WO | 97/49050 | 12/1997 |
| WO | 98/05011 | 2/1998 |
| WO | 98/13796 | 4/1998 |
| WO | 98/21667 | 5/1998 |
| WO | 98/24041 | 6/1998 |
| WO | 98/26344 | 6/1998 |
| WO | 98/26363 | 6/1998 |
| WO | 98/36456 | 8/1998 |
| WO | 98/38558 | 9/1998 |
| WO | 98/47268 | 10/1998 |
| WO | 98/49635 | 11/1998 |
| WO | 98/49639 | 11/1998 |
| WO | 98/53581 | 11/1998 |
| WO | 99/01983 | 1/1999 |
| WO | 99/08419 | 2/1999 |
| WO | 99/10795 | 3/1999 |
| WO | 99/10815 | 3/1999 |
| WO | 99/14695 | 3/1999 |
| WO | 99/19821 | 4/1999 |
| WO | 99/27477 | 6/1999 |
| WO | 99/33242 | 7/1999 |
| WO | 99/35583 | 7/1999 |
| WO | 99/36875 | 7/1999 |
| WO | 99/40502 | 8/1999 |
| WO | 99/41690 | 8/1999 |
| WO | 99/50771 | 10/1999 |
| WO | WO 00/68857 | 11/2002 |

OTHER PUBLICATIONS

Wall Street Computer Review, 1998.
Computer in the City, Conference Proceedings, 1988.
Banking Technology, 1988, vol. 5, No. 5.
Copy of Australian Search Report dated Nov. 28, 2002.

* cited by examiner

ANONYMOUS TRADING SYSTEM

FIELD OF THE INVENTION

This invention relates to electronic brokerage or trading systems and in particular to systems in which counterparties trade anonymously within fixed credit limits. Such systems may trade financial instruments such as foreign exchange and forward rate agreements.

BACKGROUND TO THE INVENTION

A number of anonymous trading systems are known in the art. EP-A-0,399,850, EP-A-0,406,026 and EP-A-0,411,748 all assigned to Reuters Ltd disclose aspects of an automated matching system in which a host computer maintains a central database of bids and offers submitted by terminals connected to the host via a network. The host also maintains records of credit limits between each trading bank and the possible counterparties with which it is willing to trade. The host computer uses information in its central database to match bids and offers and buy and sell orders based on matching criteria which include the counter party credit limits.

Generally, counterparty credit limits are set for each bank or each trading floor and the host computer establishes a gross counter party credit limit for each possible pair of counterparties. The gross counter party credit limit is the minimum amount of remaining credit between two counterparties.

A trader's terminal will display a subset of the trading book, typically the best few bids and offers. These will be updated periodically to ensure that the trader sees the true state of the market.

A problem with the system outlined above is that the trader sees the bids and offers irrespective of whether he has sufficient credit with the counter party submitting that bid or offer to trade. As a result, a trader can attempt to trade when there is no available credit. As the system is anonymous the trader has no knowledge of the counterparty until a trade as been completed and so, when he hits a bid or offer, has no idea as to whether it is likely to be accepted or rejected for lack of credit. This is extremely frustrating for a trader, particularly in a fast moving market in which trading opportunities can easily be lost. The problem arises as the host computer only checks available credit after a deal has been proposed and a potential match identified.

This problem was solved in WO93/15467 now assigned to EBS Dealing Resources Inc., the contents of which are incorporated herein by reference. Instead of displaying the actual trading book, or a part of it, to each trader, a different market view is shown to each trader in which bids and offers from counterparties which whom they have insufficient or no credit are screened out. Thus, the trader only sees prices with which he knows he can deal.

The architecture of the system of WO93/15467 is very different from the of the Reuters system and is based on a distributed network with a number of arbitrators which perform matching. Actual credit limits are stored at local bank nodes to which each of a bank's trading terminals are connected ensuring that sensitive credit data does not leave the bank's physical site. The actual trading book is sent by the arbitrators to the market distributor. The market distributor forms a market view specific to a given trading floor and sends it to the relevant bank node. A different market view may be formed for each trading floor depending on credit criteria. Thus, the market view which is distributed to each of the bank nodes is the complete market view with credit screening taking place, the market distributor to filter out any prices with which the bank, or a given trading floor within the bank, has insufficient credit.

In addition, the market distributers also have limited credit information, maintaining a credit matrix which may store a simple "yes-no" credit indicator for given counterparties. When a match is made, the prices having already been screened for credit, the bank node will make a second credit check using the credit matrix to see whether any previously extended credit has already been exhausted.

Both the above described systems have been used successfully for a number of years. However, both suffer from disadvantages associated with the geographical location of the matching engine.

In the Reuters system there is a single matching engine. In practice this is located in Long Island, N.Y., USA. Messages sent from trader terminals will take a finite time to reach the matching engine. Thus, if a trader in New York and a trader in Tokyo try and hit the same price, the New York trader's hit will always be received first. In practice, most of the trading at a given time is between traders located on the same continent but it is still disadvantageous for traders, eg. in Japan all to trade through a matching engine and deals execution system on the other side of the world as the system is inevitably sluggish.

The EBS system, in practice, provides three arbitrators, one each in New York, London and Tokyo, all three arbitrators are active of the same time and a price is owned by the arbitrator to whom the price is input is connected. Thus, where a price is input by a trader in London and hit by a trader in Tokyo, the match will be performed initially in Tokyo and then sent on the London. If, in the meantime, the same price has been hit in London, the second hit will win as it will be received by the owning arbitrator first.

SUMMARY OF THE INVENTION

The invention aims to overcome some or all of the problems set out above and to provide a trading system which can respond faster to traders around the world.

In its broadest form, the invention provides an anonymous trading system having a number of interconnected arbitrators of which only one is active at a given time.

The arbitrators are arranged in a clique and are interconnected. The arbitrators perform the matching of bids and offers and deal execution. The passive arbitrators act as market distributors.

Embodiments of the invention combine the advantages of a centralised system such as the Reuters System described above in which all matching and deal execution is performed at a central location with the advantages of a distributed system such as the EBS system mentioned above in which matching may be performed at one of a number of locations. The system may be controlled so that the active arbitrator is located in the trading region generating most trading instructions. This ensures that system response time is minimised.

Preferably, the arbitrators include a switching means which analyses incoming trading instructions and switches the location of the arbitrator when the volume of trading instructions received at one of the passive arbitrators exceeds that at the active arbitrator. The volume may be measured over a predetermined time period.

In accordance with the invention there is provided an anonymous trading system for trading financial instruments between counterparties, comprising a plurality of trader nodes for exchanging trading instructions to and from traders and for passing a view of the trading book to traders; and a plurality of interconnected matching engines for holding all trading instructions input into the system and for identifying and executing trades, wherein information relating to trades and to the trading book is passed from the matching engines to the trading nodes, and wherein at a given time only one of said matching engines is active to perform identification and execution of trades, all trading instructions input into the system being passed to and acted upon by the active matching engine.

The invention further provides an anonymous trading system for trading instruments between traders, comprising;

a communications network for transmitting electronic messages;

a plurality of trader terminals connected to the communications network each for generating electronic price quotation messages including bid and/or offer prices and for communication to a trader of price information received from other of said plurality of trader terminals over the network;

a plurality of matching engines connected to the network for matching bids and offers input into the system and for executing deals where prices are matched, each matching engine having an associated market distribution means for distributing price messages to the trader terminals, the market distribution means being responsive to the price quotation messages and the matching engine;

wherein each of the plurality of matching engines is connected to each of the other of the plurality of matching engines and, at any given time, only one of said matching engines is active performing price matching and deal execution, the remaining matching engines being passive and the market distribution means of said remaining passive matching engines distributing price messages from the active matching engine to the trader terminals.

BRIEF DESCRIPTION OF THE DRAWING

A preferred embodiment of the invention will now be described, by way of example only, and with reference to the accompanying drawings in which.

DESCRIPTION OF A PREFERRED EMBODIMENT

Figure 1:
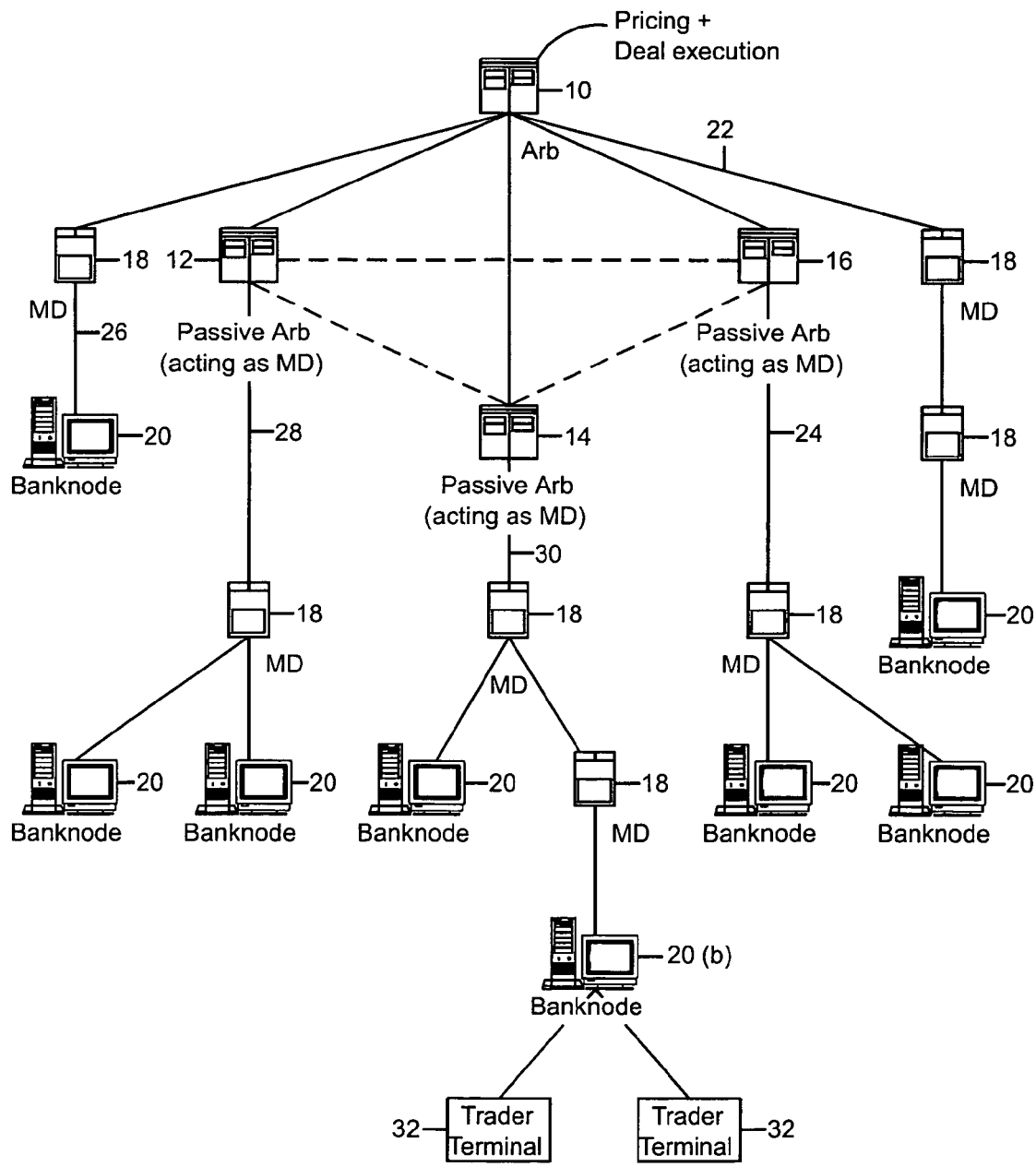
FIG. 1 is a network diagram of a system embodying the invention.

FIG. 1 illustrates a physical architecture which is comprised as a clique of arbitrators 10, 12, 14, 16 with each arbitrator having a market distributor (18) connected to it and one or more bank nodes (20) connected to that market distributor. Further market distributors may be connected in between the market distributor and the bank node as shown in branch 22. Thus, except for the arbitrator clique, the network graph is a tree and the bank nodes are always leaves; that is they are only connected to one other network node. The number of market distributors on a path from the bank node to the nearest potential arbitrator is unlimited, for example, it may be 0, not shown, 1, as shown in branches 24, 26 and or more as shown in branch 22. In branch 30 the path between bank node 20 and arbitrator 14 has a single market distributor whereas the path between bank node 20b and the arbitrator 14 has two market distributors.

Although the embodiment illustrated shows a clique of four arbitrators it should be understood that the clique could have any number greater than one.

Attached to each of the bank nodes is one more order input devices such as a trader terminal 32, two of which are shown in the figures. It is to be understood that any form of order input is possible and includes buy/sell orders or other trading orders input manually by traders or according to pre-defined conditions set by traders such as a buy/sell order that is input automatically once the market reaches a certain condition. Alternatively, the order input device could be fully automated.

The arbitrators perform the same function as in the prior art EBS system WO93/15467 referred to earlier, that is they are responsible for price matching and deal execution. As an alternative, broking nodes (FIG. 2) could be used for this purpose. A broking node combines the functionality of price matching, deal execution and market distribution. The use of a broking node is intended to mimic the functionality of a human broker, and is more flexible that the arrangement of arbitrators and market distributors in the present system. It is also less hierarchical. By definition each broking node has an equal status in the network which increases flexibility. Broking nodes are also easier to maintain party because they may be implemented using a single physical computer.

At any given time there is only one arbitrator of the clique that is active. This arbitrator performs the function of matching bids and offers input into the system and executing deals. The active arbitrator shown in the figure is arbitrator 10. While this arbitrator is active, the remaining three passive arbitrators 12, 14, 16 perform as market distributors, passing price information input to the arbitrators down the branches to the bank nodes from where it is distributed to trader terminals on a trader floor which are connected to that bank node. An example of the trader terminals 32 is shown at branch 30 connected to bank node 20b. It will be appreciated that if broking nodes are used instead of arbitrators, the market distributors functionality forms a part of the functionality of the broking node. However, if arbitrators are used with the functionality described in WO93/15467, additional market distribution functionality is required. The market distributors described in WO93/15467 provide suitable functionality.

Figure 2:
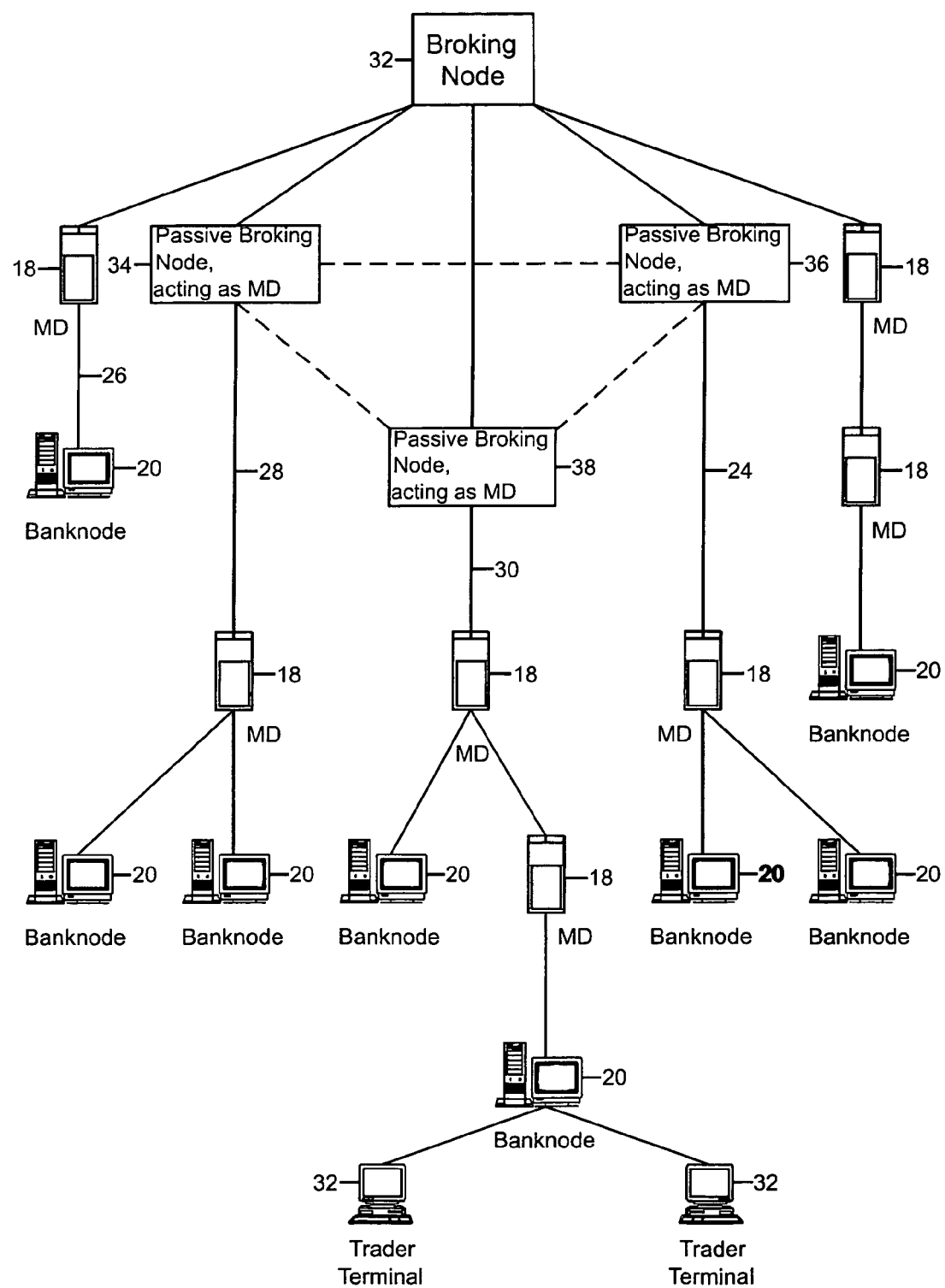
FIG. 2 is a similar diagram to FIG. 1 in which the arbitrators are replaced by broking nodes.

An example of the system using broking nodes 22, 24, 26, 28 is shown in FIG. 2. In both FIGS. 1 and 2 it should be understood that the additional market distributors 18 may be omitted as market distribution functionality can be provided solely from the matching engines.

As shown in FIGS. 1 and 2, each of the arbitrators or broking nodes in the clique are linked to all the others. The links between passive arbitrators are not used. Thus, in FIG. 2, the links between arbitrators 12 and 16, 12 and 14 and 14 and 16 are not used. As soon as a different arbitrator becomes active, some of the previously passive links are used. For example, when arbitrator 12 becomes active, the links between arbitrator 12 and the other arbitrators 10, 16 and 14 become active.

It will be seen, therefore, that the active network links always form a tree. The active arbitrator performs all broking functions. Only the active arbitrator may initiate deals and serves as the central repository of market books. The market distributors, including the passive arbitrators must, by definition, also have complete books but they only update their market book information when that information is distributed to them by the active arbitrator or where there is more than one market distributor in the branch, by an upstream market distributor who ultimately received the updated information from the active arbitrator.

Credit information may be stored at the active arbitrator in which case either each arbitrator holds all the credit information all the time or receives changes in credit information switched from one active arbitrator to the next when that active arbitrator becomes a passive arbitrator. The market distributors, including the inactive arbitrators, are responsible for maintaining their copy of market books and passing information about book updates to any downstream market distributors.

The arbitrators, broking nodes and market distributors may have bank nodes connected directly to them. In this case the market distributor or arbitrators are responsible for preparing the market view for the branch node. In doing this the market distributor or arbitrator will not pass to the bank node any prices which are not dealable (i.e., prices contributed by a counterparty with which the bank does not have credit). This assumes that the arbitrator has the necessary credit information. If credit information is stored elsewhere, such as at a bank node, then the bank node must prepare the market view for the trader terminals and the credit information must be stored in such a way as not to be accessible by the trader terminals. The process of preparing market views is described fully in WO93/15467, the contents of which are incorporated herein by reference.

When a trader inputs a new quote into a trader terminal, the quote is submitted directly to the active arbitrator. The quote may automatically be sent to the closest market distributor who will use it to generate a market view for the bank and then send the quote to the active arbitrator. Thus, referring to FIG. 1, a quote is submitted by trader terminal 22a and is passed transparently up branch 30 to arbitrator 10. Alternatively, the quote is passed first to market distributor 18a which updates the bank market view and then passes the quote to active arbitrator 10. The updated market view is passed down to the bank node 20b.

The active arbitrator will attempt to automatch the new quote. This process, described in WO93/15467 involves the arbitrators looking for an identical buy order where the quote is a sell order or vice versa. If such a match is found, the arbitrator will initialise a deal execution process following the process described in WO93/15467 which includes a credit checking process. As the system has only one active arbitrator there is no possibility of remote deal processing as can happen in the system of WO93/15467. The process differs from that of WO93/15467 only if the credit information is stored at the arbitrators in which case credit checking is performed immediately. If the credit check is unsuccessful the deal will be terminated. If the arbitrator finds no automatch, or can only automatch an amount less than the whole bid amount, the active arbitrator adds the quote, or the residual amount, to the book and informs the immediate downstream market distributors in market update messages.

In practice, it is possible that some participating banks may agree to have their credit information stored at the arbitrators and some may not. Banks are often reluctant for sensitive credit information to be stored off site. In that case, the procedures for credit checking will be a hybrid of that described below.

Although the system is anonymous, the arbitrator will have the identity of the quote owner. If that party has its credit limits stored centrally it can check credit centrally, at least for the quote owner. If the counterparty does not have its credit limits stored at the arbitrator it will have to perform credit checking at the relevant bank node.

When a trader sees a price with which he wishes to deal, he will hit that price. A hit message is sent from the trader terminal to the appropriate bank node and then to the active arbitrator directly. The arbitrator is then responsible for matching the hit. Once a match has been established, deal processing occurs in the same manner as described in WO 93/15467. As described above, the credit checking process may differ if credit data is held at the arbitrator.

The embodiments of the invention described utilizes a single active arbitrator/broking node from the clique of arbitrators/broking nodes 10, 12, 14, 16, 32, 34, 36 and 38. In the following discussion, references to the active arbitrator include the active broking node as it is the arbitrator functionality in the broking node which is active. The active arbitrator is switched such that the geographical location of the active arbitrator corresponds to the market which is most active. Thus, in the example of the figure, one of the four arbitrators will be located in London, one in New York, one in Tokyo and the fourth will be a back up. The back up will only be active if one of the other three fails whereas the other three will rotate the position of active arbitrator throughout each day as each regional market opens and closes. Switching between arbitrators to activate a fresh arbitrator as the active arbitrator could be manual, or, for example, time based such that when a given market opens, the arbitrator local to that market becomes the local arbitrator. It is preferred, however, to switch arbitrators on the basis of network volume. The active arbitrator constantly monitors the number of new quotes and hits originating from all the sub-trees belonging to the different passive arbitrators and compares them with the number of new quotes and hits originating in the active arbitrator. Based on this information the system can determine when to switch to a different arbitrator and also which the next active arbitrator should be. One possible condition would be to switch arbitrators if the number of quotes and hits at the active arbitrator over a period of time, say two minutes, is exceeded by the number of quotes and hits at another passive arbitrator over the same time period then that passive arbitrator becomes the active arbitrator.

In practice, there is a portion of the trading day when both the London and New York markets are trading simultaneously and it is possible that short busts of activity on each side of the Atlantic could cause the active arbitrator to switch very rapidly backwards and forwards, this is undesirable and system rules prevent excessive moves made in response to random activity.

When the active arbitrator switch is made, the former active arbitrator will first send a message to the new active arbitrator informing it that there is to be a switch and that it is the new active arbitrator. The former active arbitrator then stops initiating any new deals although partly completed deals are unaffected and will be completed by the former active arbitrator. However, if one of these pending deals fails, it does not perform any rematch; a process in which the arbitrator looks for another quote to match with the quoting party. Instead, the former active arbitrator sends all the deal data to the new active arbitrator which performs the rematch.

The former active arbitrator will then send all new quotes and deals received from bank nodes to the new active arbitrator. In this respect it has started to act as a passive arbitrator. Finally, it starts to act as a market distributor sending market book information received from the new active arbitrator down the line to the next market distributor. If the next node is a bank node it will also prepare the market view for that bank.

The new active arbitrator will first activate, or establish if they do not already exist, connections with all passive arbitrators and then broadcast the new active arbitrator location over the whole of the network. This ensures that all quotes and hit messages sent in the future are directed to the new active arbitrator. The messages sent will contain the sequence number of the last market update message that was sent by the former active arbitrator. The arbitrator then starts to act as an active arbitrator. At the moment that the switch message is received, the book of the new active arbitrator is identical to that of the former active arbitrator at the moment the latter ceased to perform matching. This ensures that the switch is transparent and, for example, that rematch can occur in the new arbitrator if a deal has failed in the previous arbitrator. It also ensures that only one arbitrator will initiate each potential deal avoiding the possibility of the new active arbitrator trying to initiate a deal that was initiated by the previous active arbitrator.

When remaining passive arbitrators receive the arbitrator switch message, they will compare the sequence number in the switch message and the sequence number of the last market update message. If, as a result of the comparison, the passive arbitrator decides that it has not yet received all the market update messages it will wait until the missing messages are received from the former active arbitrator before processing market update messages from the new active arbitrator. This scenario could arise, for example, if the one of the passive arbitrators is nearer the new active arbitrator than the old active arbitrator. Messages from the new active arbitrator could arrive before earlier messages from the old active arbitrator.

All other nodes on the network will note the new arbitrator's location when they receive the arbitrator switch message broadcast by the new active arbitrator and will use that location for all new quote and hit messages.

It will be appreciated from the foregoing that whichever of the FIG. 1 or FIG. 2 embodiments is used, the market distribution functionality of or associated with each broker node or arbitrator remains active at all times. It is only the deal matching and execution functionality which is switched.

One possible difficulty with the system discussed above is the need to pass the trading book from one node to another as responsibility shifts. This will take time. In an alternative embodiment, more than one, but not all, of the arbitrators are active at any one time. It is preferred in this embodiment that two arbitrators are active at any one time. In a still further embodiment, more than one arbitrator, but not all the arbitrators, are active for some but not all of the time. When the present active arbitrator signals that responsibility is to pass to another arbitrator the old and new arbitrators both become active for a set period of time. This enables the trading book to be transferred without any loss of matching and deal execution capacity.

The system described has the advantages of retaining a central matching functionality, as used in the Reuters System described earlier while retaining the advantages of having arbitrators in different locations as used in the EBS System described earlier. The system provides, in essence, a variable location host system. In addition, all matching and deal execution is performed in one place at any one time but the location of deal matching and deal execution changes over time depending on market activity. This reduces the distance between most of the market participators and the matching engine ensuring that the system reacts faster and is easier for traders to use.

The system may be implemented on a private network such as is used, for instance, by the present Reuters System or could use dedicated links over a public communications system. Alternatively the system could be Internet based. Whichever implementation is adopted, the functionality of the system is the same. Various modifications and developments are possible and will occur to those skilled in the art without departing from the scope of the invention which is defined in the claims appended hereto. In one possible modification, the matching, deal execution and market distribution functionality could be combined into a single broking functionality. The arbitrator could be replaced by broking nodes which effectively combine the arbitrator and market distributor functionality described. In such an embodiment the passive broking nodes would still perform as market distributors passing on the market book to the next node in the sub-tree.

The system described may be used to trade any instrument anonymously between counterparties. It is particularly suited to, but not limited to, financial instruments. These may include foreign exchange (F/X) spot, F/X futures, FRAs and other instruments.

What is claimed is:

1. An anonymous trading system for trading fungible instruments between traders, comprising;
   a communications network for transmitting electronic messages;
   a plurality of order input devices connected to the communications network each for generating electronic price quotation messages including bid and/or offer prices and for communicating to a trader price information received from the communication network as a function of electronic price quotation messages generated by other order input devices;
   a plurality of matching engines connected to and comprising part of the network for matching bids and offers input into the system and for executing deals where prices are matched, each matching engine having an associated market distribution means for distributing price quotation messages to an associated subset of the order input devices;
   wherein each of the plurality of matching engines is connected to each of the other of the plurality of matching engines and, at no time is more than one of said matching engines active performing price matching and deal execution, the remaining matching engines being passive and the respective market distribution means of said remaining passive matching engines distributing price messages from the active matching engine to their associated order input devices.

2. An anonymous trading system according to claim 1, comprising switching means for switching the active matching engine from one of said plurality of matching engines to another.

3. An anonymous trading system according to claim 2, wherein the switching means is responsive to the price quotation messages.

4. An anonymous trading system according to claim 3, wherein each matching engine has a switching means, the switching means comprising means for comparing the number of price messages received from order input devices connected to the active matching engines to the number of prices messages received from order input devices connected to each of the passive matching engines, and means for switching the location of the active matching engine matching engine receiving the greatest number of price messages.

5. An anonymous trading system according to, claim 1 wherein the matching engines are arranged as a clique.

6. An anonymous trading system according to claim 5, wherein the order input devices are grouped into trading floors and the order input devices of each trading floor are connected to a bank node.

7. An anonymous trading system according to claim 6, wherein the bank nodes are each connected to a particular one of said plurality of matching engines on a branch of said communications network.

8. An anonymous trading system according to claim 7, wherein one or more branches of the network include at least one further market distribution means arranged in between the bank node and the market distribution means associated with the particular matching engine.

9. An anonymous trading system according to claim 8, wherein the market distribution means adjacent a bank node in each branch of the network includes means for preparing a market view for order input devices connected to that bank node.

10. An anonymous trading system according to claim 1, wherein the matching engines each comprise broking nodes including means for matching prices, means for executing deals and means for distributing prices.

11. An anonymous trading system according to claim 1, wherein at least some of said matching engines correspond to different global trading regions, and are located in their respective trading region.

12. An anonymous trading system for trading fungible instruments between counterparties, comprising:
 a plurality of order input devices for exchanging trading instructions to and from traders and for passing a view of a trading book to traders; and
 a plurality of interconnected matching engines for holding trading instructions input into the system and for identifying and executing trades, wherein information relating to trades and to the trading book is passed from the matching engines to the order input devices, and wherein at no time is more than one of said matching engines active to perform identification and execution of trades, all trading instructions input into the system being passed to and acted upon by the active matching engine.

13. An anonymous trading system according to claim 12, wherein the non-active matching engines of said plurality of matching engines distribute information relating to trades and to trading information to the order input devices.

14. An anonymous trading system according to claim 12, comprising switching means for switching the location of the active matching engine from one of said plurality of matching engines to another.

15. An anonymous trading system according to claim 14, wherein said switching means is responsive to market conditions.

16. An anonymous trading system according to claim 15, wherein said switching means switches the active matching engine to the matching engine receiving the greatest volume of trading instructions.

17. An anonymous trading system according to claim 14, wherein the switching means switches between a former active matching engine and a new active matching engine and comprises means at the former active matching engine for sending a message to the new active matching engine informing it that it has become the active matching engine, and means for forwarding trading instructions received at the former active matching engine to the new active matching engine.

18. An anonymous trading system according to claim 17, wherein the switching means further comprises means for broadcasting the location of the new active matching engine over the network.

19. An anonymous trading system according to claim 18, wherein each of the non-active matching engines comprises means for receiving the broadcast active matching engine message and for comparing an attribute of that message with an attribute of the last trading book information message received from the former active matching engine, wherein, if the comparison shows that no further trading book information messages are still to be received from the former active matching engine, the means processes trading book information messages from the new active matching engine, and, if the comparison shows that there are further trading book information messages to be received from the former active matching engine, the means delays processing trading book information messages from the new active matching engine until all trading book information messages have been received from the former active matching engine.

20. An anonymous trading system according to claim 19, wherein the attribute compared is a message sequence number.

21. An anonymous trading system according to claim 1, wherein the order input devices comprise trader terminals.

22. An anonymous trading system according to claim 12, wherein the order input devices comprised trader terminals.

* * * * *